United States Patent
Okazaki (10) Patent No.: US 10,387,092 B2
(45) Date of Patent: Aug. 20, 2019

(54) IMAGE FORMING APPARATUS (71) Applicant: KYOCERA Document Solutions Inc., Osaka (JP)

(72) Inventor: Yusuke Okazaki, Osaka (JP)

(73) Assignee: Kyocera Document Solutions, Inc. (JP)

( * ) Notice: Subject to any disclaimer, the term of this patent is extended or adjusted under 35 U.S.C. 154(b) by 20 days.

(21) Appl. No.: 15/877,052

(22) Filed: Jan. 22, 2018

(65) Prior Publication Data

US 2018/0210691 A1 Jul. 26, 2018

(30) Foreign Application Priority Data

Jan. 26, 2017 (JP) .................................. 2017-012527

(51) Int. Cl.
*G06F 3/12* (2006.01)
*G06K 7/14* (2006.01)
*H04N 1/00* (2006.01)
*G06K 19/06* (2006.01)

(52) U.S. Cl.
CPC ......... *G06F 3/1297* (2013.01); *G06K 7/1417* (2013.01); *G06K 7/1443* (2013.01); *G06K 7/1491* (2013.01); *G06K 19/06037* (2013.01); *H04N 1/00005* (2013.01)

(58) Field of Classification Search
CPC .. G06F 3/1297; G06K 7/1417; G06K 7/1443; G06K 7/1491; G06K 19/06037; H04N 1/00005
See application file for complete search history.

(56) References Cited

U.S. PATENT DOCUMENTS 8,254,683 B2 * 8/2012 Yamaguchi ............... G06K 7/10
235/454
2004/0182930 A1 * 9/2004 Nojiri ............... G06K 19/06037
235/462.04

FOREIGN PATENT DOCUMENTS

JP 2003-087458 3/2003
JP 2007-079781 3/2007

* cited by examiner

Primary Examiner — Quang N Vo (57) ABSTRACT

In an image forming apparatus, a 2D code detecting unit detects a 2-dimensional code in a document image to be printed. A divisional code distributing unit (a) removes the 2-dimensional code in the document image, (b) divides the 2-dimensional code into a predetermined number of divisional codes, (c) performs a zooming process and/or a rotation process for a part or all of the divisional codes, (d) distributes the divisional codes after the zooming process and/or the rotation process, and (e) generates and outputs a decode key that includes (e1) the number of the divisional codes, (e2) positions of the divisional codes, and (e3) a zooming ratio of the zooming process and/or a rotation angle of the rotation process. A printing device prints the document image in which the divisional codes are distributed.

8 Claims, 6 Drawing Sheets

FIG. 6

# IMAGE FORMING APPARATUS

CROSS-REFERENCE TO RELATED APPLICATIONS

This application relates to and claims priority rights from Japanese Patent Application No. 2017-012527, filed on Jan. 26, 2017, the entire disclosures of which are hereby incorporated by reference herein.

BACKGROUND

1. Field of the Present Disclosure

The present disclosure relates to an image forming apparatus.

2. Description of the Related Art

An image forming system divides a document image and thereby generates divisional images, encodes the divisional images into barcodes, and prints a set of the barcodes instead of the document image.

A 2-dimensional code divisionally displaying method divides a micro QR code into two divisional codes, and displays the two divisional codes arranging in a narrow area.

When it is required to conceal existence of a 2-dimensional code in a document image, for example, it is conceivable to divide a 2-dimensional code and arrange divisional codes as mentioned. However, the original 2-dimensional code is easily restored from the divisional codes, even when arranging the divisional codes obtained by dividing the 2-dimensional code.

SUMMARY

An image forming apparatus according to an aspect of the present disclosure includes a 2D code detecting unit, a divisional code distributing unit, and a printing device. The 2D code detecting unit is configured to detect a 2-dimensional code in a document image to be printed. The divisional code distributing unit is configured to (a) remove the 2-dimensional code in the document image, (b) divide the 2-dimensional code into a predetermined number of divisional codes, (c) perform a zooming process and/or a rotation process for a part or all of the divisional codes, (d) distribute the predetermined number of the divisional codes after the zooming process and/or the rotation process, and (e) generate and output a decode key that includes (e1) the number of the divisional codes, (e2) positions of the divisional codes, and (e3) a zooming ratio of the zooming process and/or a rotation angle of the rotation process. The printing device is configured to print the document image in which the predetermined number of the divisional codes are distributed.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
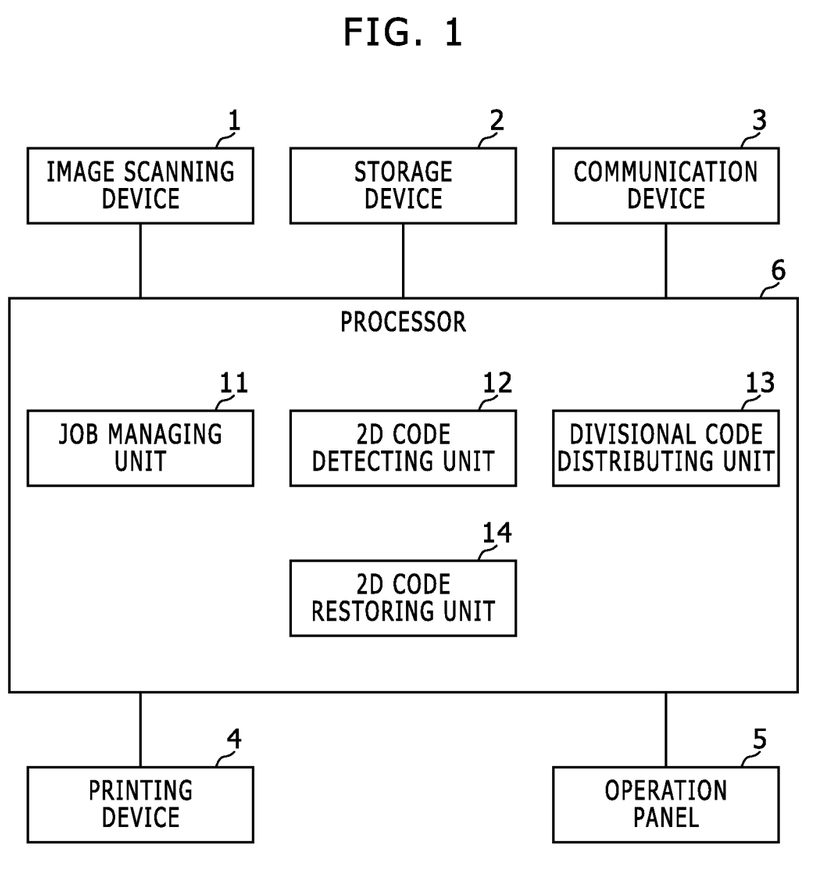
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. The image forming apparatus shown in FIG. 1 includes an image scanning device 1, a storage device 2, a communication device 3, a printing device 4, an operation panel 5, and a processor 6.

The image scanning device 1 is an internal device that optically scans a document image of a document, and generates image data (RGB data, here) of the document image.

Further, the storage device 2 is a device capable of storing sorts of data and programs. A non-volatile storage medium with a large capacity is used as the storage device 2, such as non-volatile memory or hard disk drive. The storage device 2 is enabled, for example, to store the image data of the document image.

Further, the communication device 3 is a device that performs data communication with an external server, an external host device or the like. A network interface that performs network communication, a modem which performs facsimile communication or the like is used as the communication device 3.

Furthermore, the printing device 4 performs printing of the document image based on image data of the document image.

Furthermore, the operation panel 5 includes a display device (a liquid crystal display or the like) that displays sorts of screens to a user and an input device (touch panel or the like) that detects a user operation.

The processor 6 is a computer that includes a CPU (Central Processing Unit), a ROM (Read Only Memory), a RAM (Random Access Memory) and the like, loads a program from the ROM or the storage device 2 to the RAM, and executes the program with the CPU and thereby acts as various processing units. In this embodiment, the processor 6 acts as a job managing unit 11, a 2D code detecting unit 12, a divisional code distributing unit 13, a 2D code restoring unit 14 and the like.

The job managing unit 11 performs a process according to a job request when receiving the job request for a print job, a scan job, a copy job or the like from the operation panel 5 or the like.

The 2D code detecting unit 12 detects a 2-dimensional code (e.g. QR code (registered trademark)) in a document image to be printed. For example, when receiving a job request of a print job, the 2D code detecting unit 12 reads image data of a document image from the storage device 2 or receives image data of a document image using the communication device 3 from an external server or a host device, determines the document image, and detects a 2-dimensional code in the document image.

Figure 2:
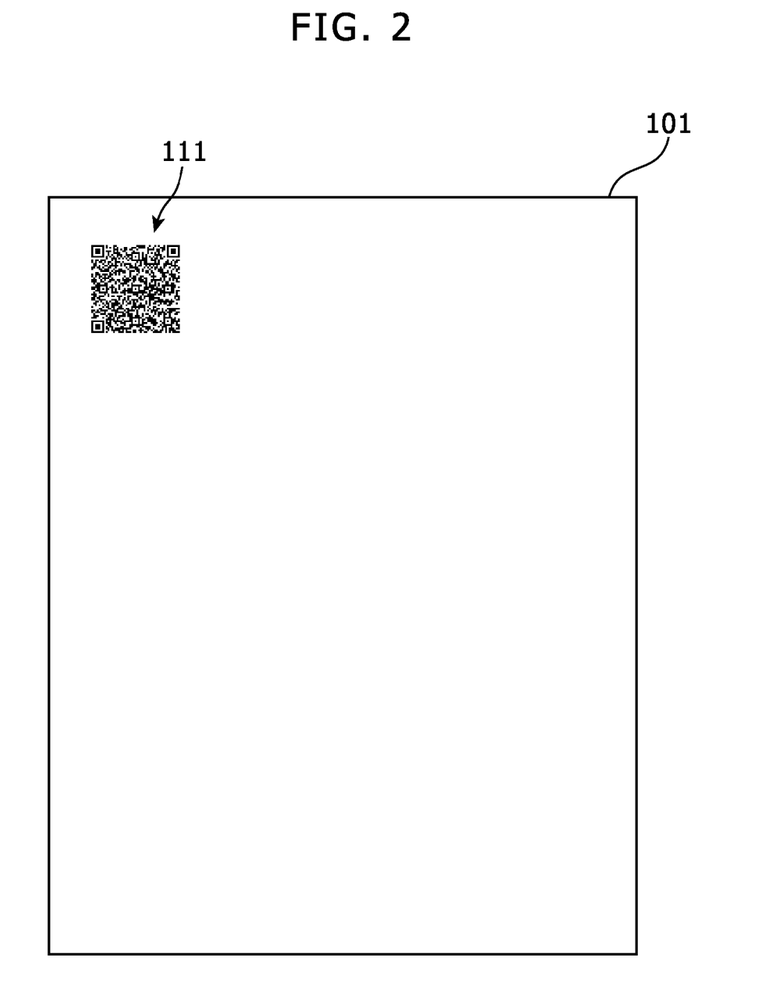
FIG. 2 shows a diagram that indicates an example of a document image.

FIG. 2 shows a diagram that indicates an example of a document image. The document image 101 shown in FIG. 2 includes a 2-dimensional code 111. For example, the 2D code detecting unit 12 searches for a unique image pattern such as a finder symbol in the document image 101 and thereby detects the 2-dimensional code 111.

The divisional code distributing unit 13 (a) divides the 2-dimensional code 111 into a predetermined number of divisional codes 111-(1, 1) to 111-(N, M), (b) performs a zooming process and/or a rotation process for a part or all of the divisional codes 111-(1, 1) to 111-(N, M), (c) removes the 2-dimensional code 111 in the document image 101, (d) irregularly distributes the divisional codes 111-($i$, $j$) after the zooming process and/or the rotation process on the document image 101, and (e) generates and output a decode key that includes (e1) the number of the divisional codes 111-(1, 1) to 111-(N, M) (i.e. N*M), (e2) positions of the divisional codes 111-(1, 1) to 111-(N, M), and (e3) a zooming ratio of the zooming process and/or a rotation angle of the rotation process of each divisional code 111-($i$, $j$) for which the zooming process and/or the rotation process has been performed. For example, the divisional code distributing unit 13 transmits the generated decode key to a predetermined address (a user terminal device or the like) using the communication device 3. The decode key may include not only the positions of the divisional codes 111-(1, 1) to 111-(N, M) but sizes of the divisional codes 111-(1, 1) to 111-(N, M).

Figure 3:
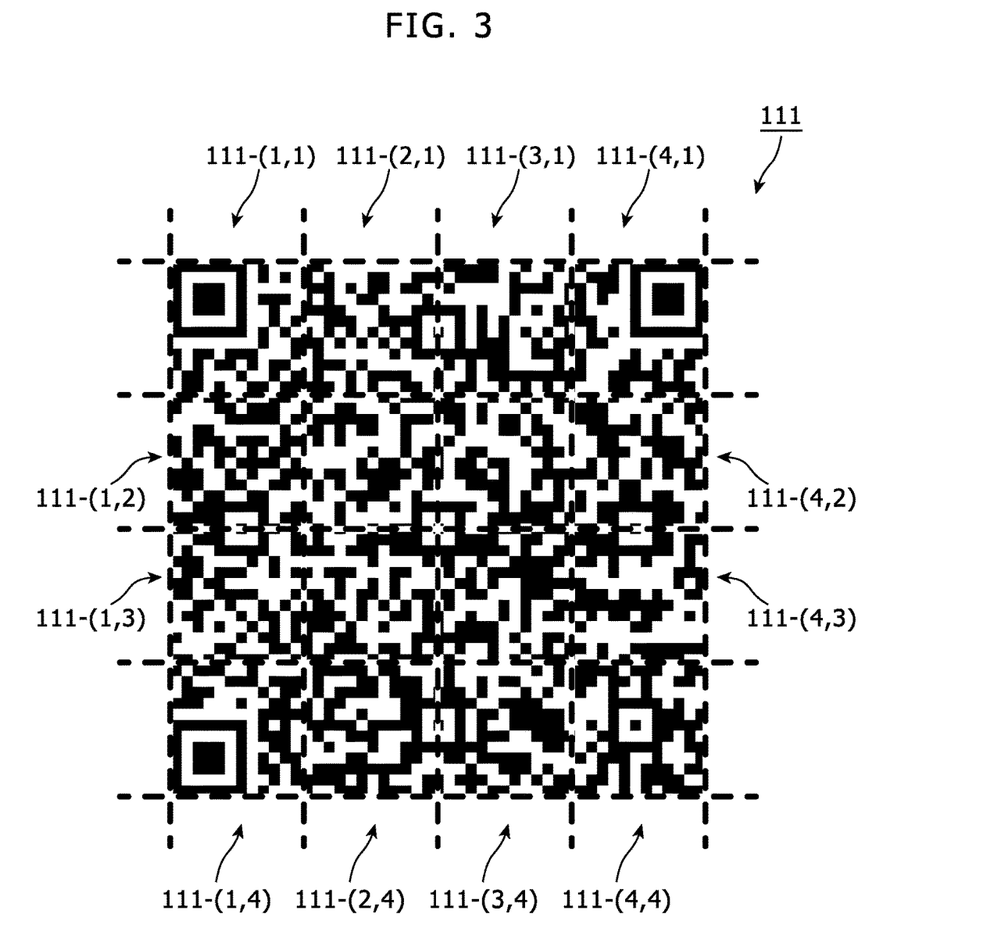
FIG. 3 shows a diagram that indicates an example of divisional codes.

FIG. 3 shows a diagram that indicates an example of divisional codes. The divisional codes 111-(X, Y) (X=1, . . . , N, Y=1, . . . , M) shown in FIG. 3 are obtained by dividing the 2-dimensional code 111 by N in a horizontal direction and by M in a vertical direction (in FIG. 3, N=4, M=4). The division number M in a vertical direction and the division number N in a horizontal direction may be same as each other or may be different from each other. It is favorable that the division number M in a vertical direction and the division number N are equal to or larger than 2.

Figure 4:
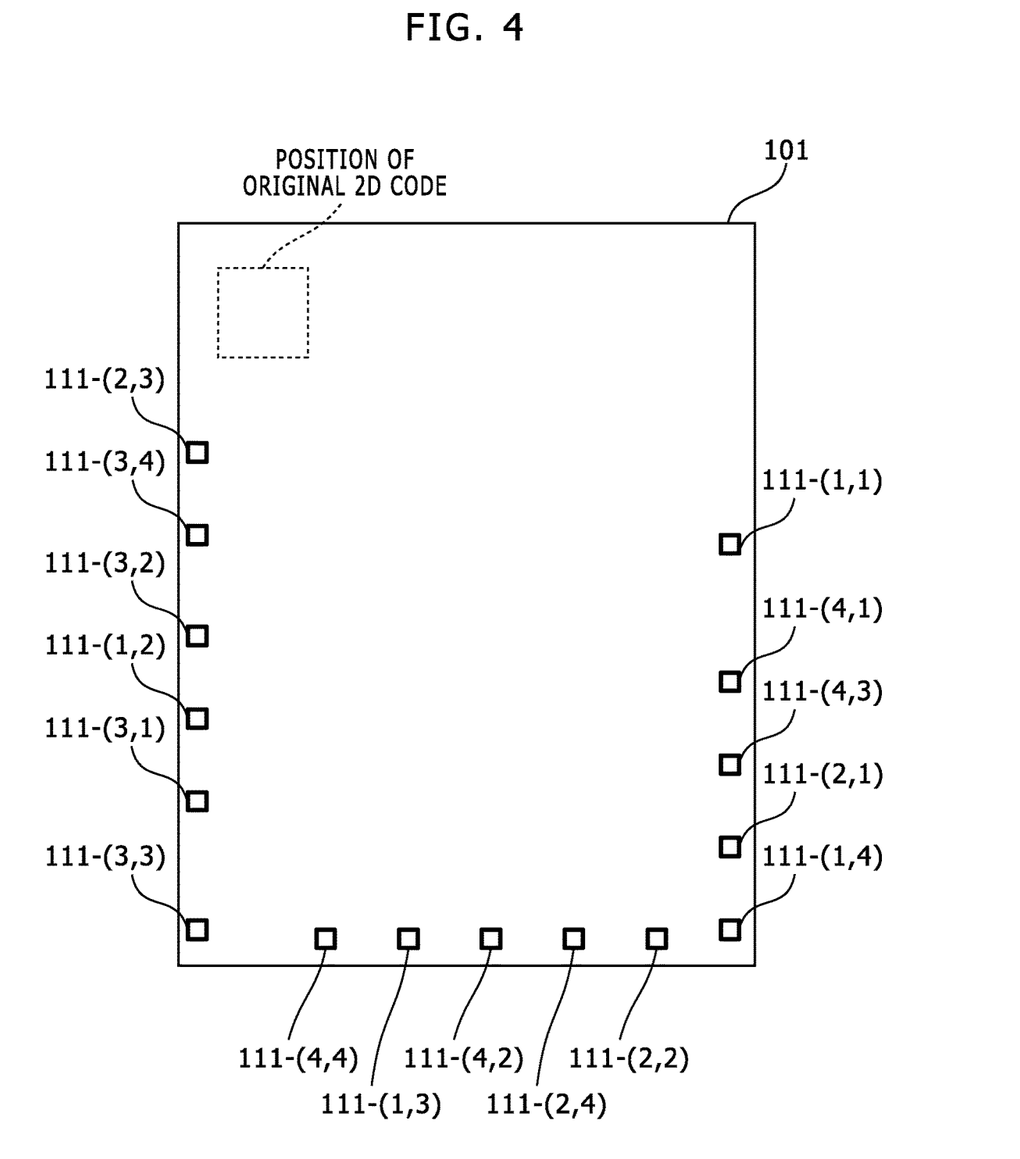
FIG. 4 shows a diagram that includes an example of a document image on which the divisional codes are distributed by a divisional code distributing unit 13 shown in FIG. 1.

FIG. 4 shows a diagram that includes an example of a document image on which the divisional codes are distributed by the divisional code distributing unit 13 shown in FIG. 1. In FIG. 4, the divisional codes 111-(1, 1) to 111-(4, 4) are distributed on the document image 101. In the document image 101, the original 2-dimensional code 111 is removed.

For example, the divisional code distributing unit 13 determines an arrangement position of each divisional code 111-($i$, $j$) on the basis of a random number, and thereby irregularly arranges the divisional code 111-($i$, $j$). In such a case, as shown in FIG. 4, the arrangement position of the divisional code 111-($i$, $j$) may be determined in a blank with a predetermined width on the basis of a random number.

Further, the divisional code distributing unit 13 may irregularly determine a zooming ratio and a rotation angle to be applied to the divisional code 111-($i$, $j$) on the basis of a random number from predetermined plural zooming ratios (e.g. 0.8 time, 1 time, 1.2 time) and predetermined plural rotation angles (e.g. 0 degree, 90 degrees, 180 degrees, 270 degrees).

When the process of the divisional code distributing unit 13 is finished, the job managing unit 11 outputs a print instruction to the printing device 4, and thereby the printing device 4 prints the document image 101 on which the predetermined number of the divisional codes 111-(1, 1) to 111-(N, M) has been distributed.

If the aforementioned predetermined number of the divisional codes 111-(1, 1) to 111-(N, M) are distributed in the document image 101 scanned by the image scanning device 1, the 2D code restoring unit 14 obtains the decode key, detects the aforementioned predetermined number of the divisional codes 111-(1, 1) to 111-(N, M) distributed in the document image 101 on the basis of the decode key, and restores the 2-dimensional code 111 from the detected divisional codes 111-(1, 1) to 111-(N, M) on the basis of the decode key.

In this embodiment, the aforementioned decode key may include a position and a size of the 2-dimensional code 111 in the document image 101, and the 2D code restoring unit 14 may arrange the restored 2-dimensional code 111 at the position and the size indicated by the decode key.

Further, in this embodiment, the 2D code restoring unit 14 may (a) cause the printing device 4 to print the restored 2-dimensional code 111 individually to the document image 101, (b) cause a display device of the operation panel 5 to display the restored 2-dimensional code 111 or (c) cause the communication device 3 to transmit the restored 2-dimensional code 111 to a predetermined address.

The following part explains a behavior of the aforementioned image forming apparatus.

(a) Behavior when Printing

Figure 5:
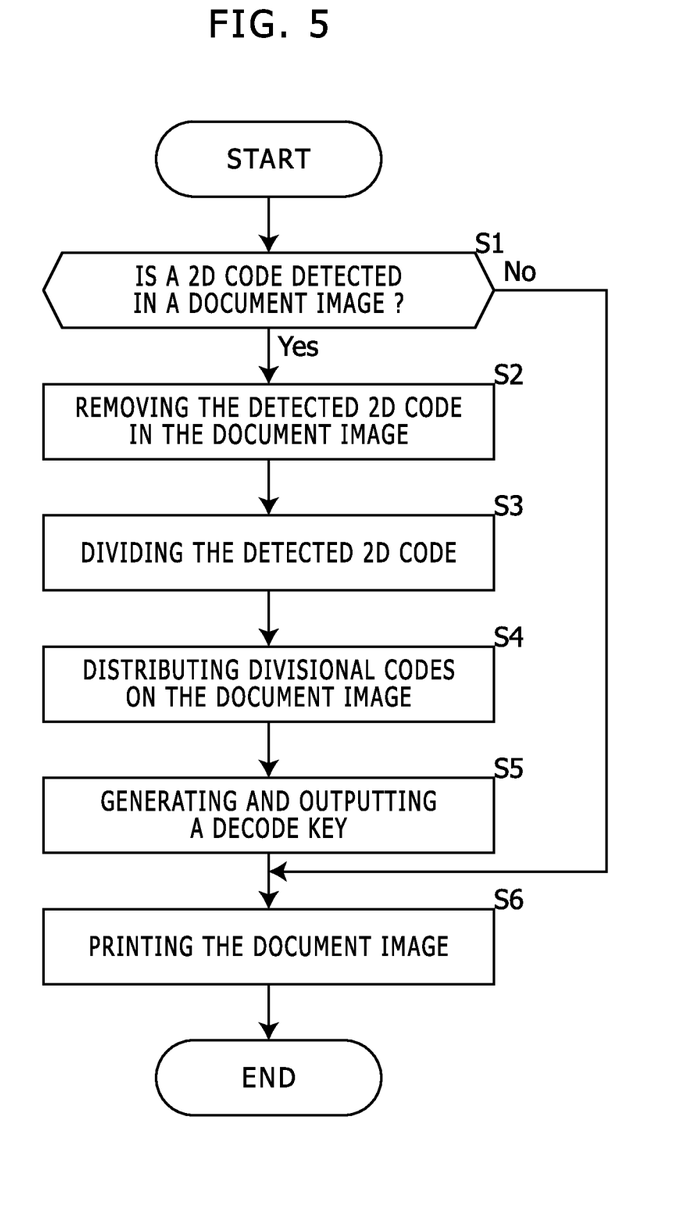
FIG. 5 shows a flowchart that explains a behavior of the image forming apparatus shown in FIG. 1 when printing.

FIG. 5 shows a flowchart that explains a behavior of the image forming apparatus shown in FIG. 1 when printing.

For example, in a print job, the 2D code detecting unit 12 searches a 2-dimensional code in a document image 101, and determines whether a 2-dimensional code is detected in the document image 101 or not (in Step S1).

If a 2-dimensional code 111 is detected in the document image 101, then the divisional code distributing unit 13 firstly maintains image data of the detected 2-dimensional code 111 in the RAM or the like and subsequently removes the 2-dimensional code 111 in the document image 101 (in Step S2).

Subsequently, the divisional code distributing unit 13 divides the detected 2-dimensional code 111 into a predetermined number of divisional codes 111-(1, 1) to 111-(N, M) (in Step S3).

Subsequently, the divisional code distributing unit 13 performs a zooming process and/or a rotation process for a part or all of the divisional codes 111-(1, 1) to 111-(N, M), and irregularly distributes the divisional codes 111-(1, 1) to 111-(N, M) after the zooming process and/or the rotation process on the document image (in Step S4).

In addition, the divisional code distributing unit 13 generates and outputs a decode key of the 2-dimensional code 111 of this document image 101 in the aforementioned manner (in Step S5).

When the process of the divisional code distributing unit 13 is finished as mentioned, the job managing unit 11 performs predetermined image processing (color conversion, halftoning or the like) for the processed document image, and thereafter causes the printing device 4 to print the processed document image (in Step S6).

If no 2-dimensional codes are detected in the document image (in Step S1), then the processes of Steps S2 to S5 are not performed, and printing of the document image is performed (in Step S6).

Consequently, a printed matter of the document image 101 is obtained as shown in FIG. 4.

(b) Behavior when Image Scanning

Figure 6:
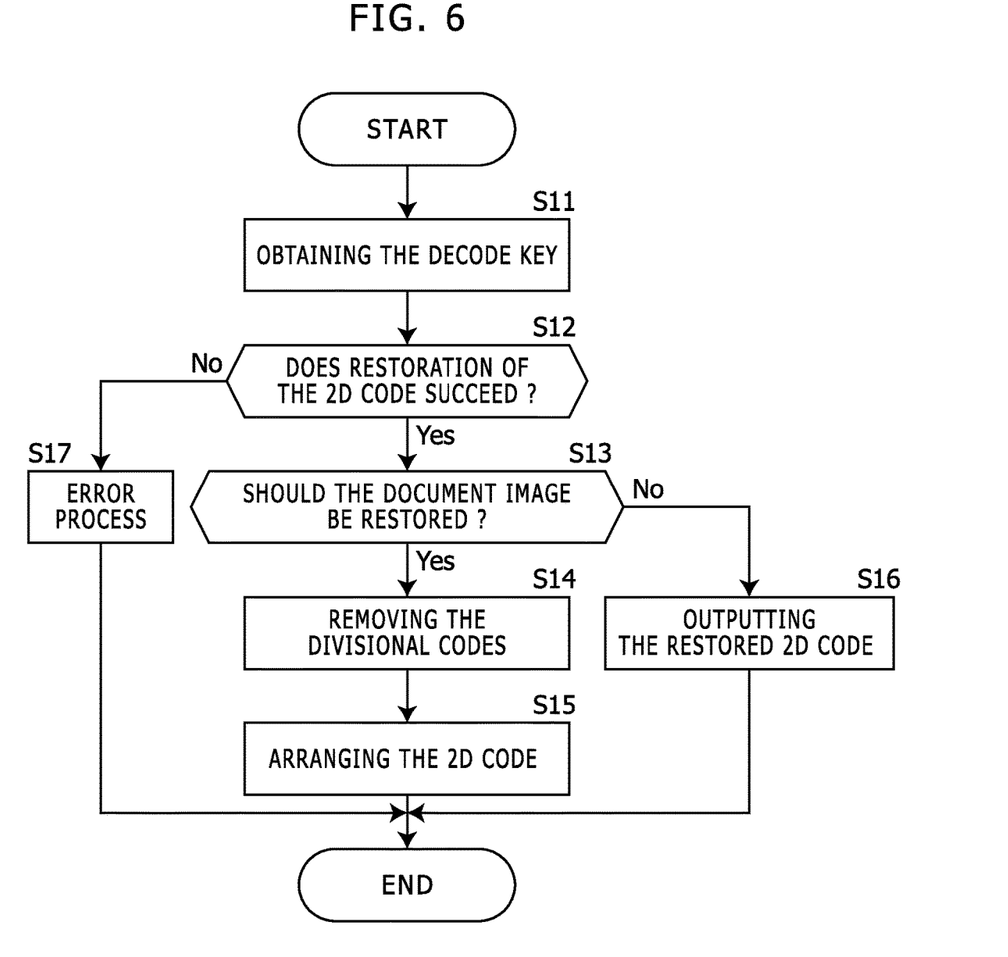
FIG. 6 shows a flowchart that explains a behavior of the image forming apparatus shown in FIG. 1 when image scanning.

FIG. 6 shows a flowchart that explains a behavior of the image forming apparatus shown in FIG. 1 when image scanning.

For example, in a scan job, if a specific mode (a mode to restore a 2-dimensional code 111 from all divisional codes 111-(i, j) distributed in a document image 101) is instructed by a user, then the job managing unit 11 reads a document image 101 using the image scanning device 1, and the 2D code restoring unit 14 obtains a decode key (in Step S11).

For example, the 2D code restoring unit 14 performs data communication with a user terminal device using the communication device 3 and thereby receives the decode key from the terminal device.

Subsequently, on the basis of the obtained decode key, the 2D code restoring unit 14 extracts all divisional codes 111-(1, 1) to 111-(N, M) from the document image 101, performs an inverted zooming process and/or an inverted rotation process for a part or all of the divisional codes 111-(1, 1) to 111-(N, M) in accordance with the decode key, and combines the processed divisional codes 111-(1, 1) to 111-(N, M) and thereby tries to restore a 2-dimensional code 111.

If the restoration of the 2-dimensional code 111 succeeded, then the 2D code restoring unit 14 causes the operation panel 5 to display a selection screen to cause a user to select a subsequent process, and when a user operation to the selection screen is detected by the operation panel 5, the 2D code restoring unit 14 determines whether restoration of the document image 101 is selected or not (in Step S13).

If the restoration of the document image 101 is selected (in Step S13), then the 2D code restoring unit 14 removes all of the divisional codes 111-(i, j) in the document image 101 (in Step S14), and arranges the restored 2-dimensional code 111 at the position and the size of the original 2-dimensional code 111 indicated by the decode key in the document image (in Step S15).

Contrarily, if the restoration of the document image 101 is not selected but output of the 2-dimensional code 111 is selected (in Step S13), the 2D code restoring unit 14 outputs the 2-dimensional code 111 in a manner selected in the aforementioned selection screen (any of printing only the 2-dimensional code 111, displaying the 2-dimensional code on the operation panel 5, and transmitting the 2-dimensional code 111 using the communication device 3) (in Step S16).

It should be noted that if the restoration of the 2-dimensional code 111 did not succeed in Step S12, the 2D code restoring unit 14 performs an error process (displaying an error message or the like) (in Step S17), and terminates the job.

In the aforementioned embodiment, the 2D code detecting unit 12 detects a 2-dimensional code 111 in a document image 101 to be printed. The divisional code distributing unit 13 (a) removes the 2-dimensional code 111 in the document image 101, (b) divides the 2-dimensional code 111 into a predetermined number of divisional codes 111-(i, j), (c) performs a zooming process and/or a rotation process for a part or all of the predetermined number of the divisional codes 111-(i, j), (d) irregularly distributes the predetermined number of the divisional codes after the zooming process and/or the rotation process on the document image 101, and (e) generates and outputs a decode key that includes (e1) the number of the divisional codes 111-(i, j), (e2) positions of the divisional codes 111-(i, j), and (e3) a zooming ratio of the zooming process and/or a rotation angle of the rotation process of each divisional code 111-(i, j) for which the zooming process and/or the rotation process has been performed. The printing device 4 prints the document image 101 in which the predetermined number of the divisional codes 111-(i, j) are distributed.

This 2-dimensional code can be restored by the 2D code restoring unit 14 on the basis of the decode key from the document image in which the divisional codes are distributed.

Consequently, in addition to dividing the 2-dimensional code into divisional codes (2-dimensional images), the divisional codes are zoomed and/or rotated, and therefore it is difficult to guess that the 2-dimensional code exists in the document image, a person who does not have the decode key hardly restores the 2-dimensional code from the divisional codes, and the existence of the 2-dimensional code included in the document image is effectively concealed.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, if the document image is one of document images of a series of plural pages, then the divisional code distributing unit 13 may distribute the divisional codes on the plural pages (i.e. a part of the divisional codes may be arranged in each page of the plural pages). In such a case, after image scanning of the plural pages, the 2D code restoring unit 14 determines the divisional codes distributed over the plural pages and restores the original 2-dimensional code. In addition, it may be enabled to apply a setting that no divisional codes are arranged in a specific page among the plural pages of the document image in accordance with a size of a blank in the page.

Further, in the aforementioned embodiment, a collective image having the same size of the original 2-dimensional code 111 may be generated by (a) performing a rotation process with irregular rotation angles for the divisional codes 111-(1, 1) to 111-(N, M) (without a zooming process) and (b) arranging the rotated divisional codes so that N divisional codes are continued in a horizontal direction and M divisional codes are continued in a vertical direction; and the collective image may be arranged at the same position of the original 2-dimensional code 111. This generation and arrangement of the collective image may be performed, for example, when the document image includes no blanks, when the document image is a sole one-page document, or the like.

Furthermore, in the aforementioned embodiment, one or plural dummy codes (2-dimensional images) other than the divisional codes 111-(1, 1) to 111-(N, M) may be arranged in the document image 101, and a position (and a size) of each dummy code may be included in the decode key. In such a case, the 2-dimensional code 111 is restored from the divisional codes 111-(1, 1) to 111-(N, M) so as to exclude the dummy code on the basis of the decode key. In addition, a type (shape, dot pattern or the like) of the dummy code may be also included in the decode key; and if all of the divisional codes 111-(1, 1) to 111-(N, M) and the dummy code indicated by the decode key are detected, then the 2-dimensional code 111 may be restored. The number of the dummy codes may be changeable in accordance with an importance or a blank size of the document image 101. The existence of the dummy code makes it difficult to infer the original 2-dimensional code 111 from the divisional codes 111-(1, 1) to 111-(N, M) in the document image 101.

Furthermore, in the aforementioned embodiment, other than the rotation process and the zooming process, an inversion process may be performed for a part or all of the divisional codes 111-(1, 1) to 111-(N, M) (for example, so as to irregularly select a type of the inversion process). As the inversion process, density inversion, horizontal flipping, vertical flipping or the like is applied. The density inversion is a process to change a high density pixel to a low density pixel and change a low density pixel to a high density pixel in the divisional code 111-(i, j). The horizontal flipping is a process that the right half and the left half are inverted to each other with a vertical center axis as a center. The vertical flipping is a process that the upper half and the lower half are inverted to each other with a horizontal center axis as a center. In such a case, inversion process information indicates (a) the divisional code 111-(i, j) for which the inversion process has been performed and (b) a type of the inversion process (any of plural types such as the aforementioned density inversion, the aforementioned horizontal flipping and the aforementioned vertical flipping), and the inversion process information is included in the decode key; and when restoring the 2-dimensional code 111, an inverted inversion process is performed for the divisional code 111-(i, j) on the basis of the inversion process information.

Furthermore, in the aforementioned embodiment, when a 2-dimensional code wants to be arranged on a document image such as brochure or photograph that requires beauty appearance, the divisional codes are distributed rather than a large 2-dimensional code, and therefore, the document image is obtained with favorable beauty appearance.

What is claimed is:

1. An image forming apparatus, comprising:
   a 2D code detecting unit configured to detect a 2-dimensional code in a document image to be printed;
   a divisional code distributing unit configured to (a) remove the 2-dimensional code in the document image, (b) divide the 2-dimensional code into a predetermined number of divisional codes, (c) perform a zooming process and/or a rotation process for a part or all of the divisional codes, (d) distribute the predetermined number of the divisional codes after the zooming process and/or the rotation process, and (e) generate and output a decode key that includes (e1) the number of the divisional codes, (e2) positions of the divisional codes, and (e3) a zooming ratio of the zooming process and/or a rotation angle of the rotation process; and
   a printing device configured to print the document image in which the predetermined number of the divisional codes are distributed.

2. The image forming apparatus according to claim 1, wherein the document image is one of document images of a series of plural pages; and
   the divisional code distributing unit distributes the divisional codes on the plural pages.

3. The image forming apparatus according to claim 1, wherein the divisional code distributing unit performs an inversion process other than the zooming process and the rotation process for a part or all of the divisional codes, and includes into the decode key inversion process information that indicates a divisional code for which the inversion process has been performed and a type of the inversion process.

4. The image forming apparatus according to claim 1, wherein the divisional code distributing unit arranges not only the predetermined number of the divisional codes but a dummy code on the document image.

5. The image forming apparatus according to claim 1, wherein the divisional code distributing unit continuously arranges the predetermined number of the divisional codes at a position as same as a position of the 2-dimensional code so as to make a shape of the arranged divisional codes same as a shape of the 2-dimensional code.

6. The image forming apparatus according to claim 1, further comprising:
   an image scanning device configured to scan the document image on which the predetermined number of the divisional codes are distributed; and
   a 2D code restoring unit configured to restore the 2-dimensional code from the predetermined number of the divisional codes in the document image on the basis of the decode key.

7. The image forming apparatus according to claim 6, wherein the decode key includes a position and a size of the 2-dimensional code in the document image; and
   the 2D code restoring unit arranges the restored 2-dimensional code at the position and the size indicated by the decode key.

8. The image forming apparatus according to claim 6, wherein the 2D code restoring unit (a) causes a printing device to print the restored 2-dimensional code individually to the document image, (b) causes a display device to display the restored 2-dimensional code or (c) causes a communication device to transmit the restored 2-dimensional code to a predetermined address.

* * * * *